US012187058B2

(12) United States Patent
Kanno et al.

(10) Patent No.: US 12,187,058 B2
(45) Date of Patent: Jan. 7, 2025

(54) PRINTING APPARATUS

(71) Applicant: SEIKO EPSON CORPORATION, Tokyo (JP)

(72) Inventors: Yusuke Kanno, Shiojiri (JP); Hironori Maekawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 137 days.

(21) Appl. No.: 18/171,905

(22) Filed: Feb. 21, 2023

(65) Prior Publication Data

US 2023/0264487 A1 Aug. 24, 2023

(30) Foreign Application Priority Data

Feb. 21, 2022 (JP) ................................ 2022-024536

(51) Int. Cl.

| | |
|---|---|
| ***B41J 3/407*** | (2006.01) |
| ***B41J 2/14*** | (2006.01) |
| ***B41J 2/215*** | (2006.01) |
| ***B41J 11/00*** | (2006.01) |
| ***B41J 29/38*** | (2006.01) |
| ***B65H 5/22*** | (2006.01) |

(52) U.S. Cl.

CPC ......... *B41J 3/4075* (2013.01); *B41J 2/14201* (2013.01); *B41J 2/215* (2013.01); *B41J 11/0095* (2013.01); *B41J 29/38* (2013.01); *B65H 5/222* (2013.01)

(58) Field of Classification Search

CPC ...... B41J 3/4075; B41J 2/14201; B41J 2/215; B41J 11/0095; B41J 29/38; B41J 2/325; B65H 5/222; B65H 29/54; B65H 2301/4461; B65H 2511/13; B65H 2515/20; B65H 2515/81; B65H 2701/194

See application file for complete search history.

(56) References Cited

U.S. PATENT DOCUMENTS

| | | | | |
|---|---|---|---|---|
| 7,042,478 B2 * | 5/2006 | Bouverie | ............ | B41J 11/0095 347/177 |
| 10,350,917 B2 * | 7/2019 | Inoue | .................... | B41J 3/4075 |
| 10,625,527 B2 * | 4/2020 | Sato | ........................ | B41J 32/00 |

FOREIGN PATENT DOCUMENTS

| | | |
|---|---|---|
| JP | 2020-032566 A | 3/2020 |

* cited by examiner

*Primary Examiner* — Kristal Feggins
(74) *Attorney, Agent, or Firm* — WORKMAN NYDEGGER

(57) ABSTRACT

A printing apparatus includes a printing head; an airflow generating unit; a first flow path that includes a one-side end coupled to the airflow generating unit and an another-side end coupled to a first discharge port and through which the airflow passes; and a peeling unit configured to partially peel the label from the base sheet. When, the label partially peeled from the base sheet by the peeling unit, at least a portion of a peeled portion peeled from the base sheet is at a position not overlapping with the peeling unit in plan view and a non-peeled portion not peeled from the base sheet is in a state of overlapping with the peeling unit in plan view, the first discharge port is disposed at such a position that the airflow outputted from the first discharge port hits the back surface of the peeled portion.

9 Claims, 7 Drawing Sheets

PRINTING APPARATUS

The present application is based on, and claims priority from JP Application Serial Number 2022-024536, filed on Feb. 21, 2022, the disclosure of which is hereby incorporated by reference herein in its entirety.

BACKGROUND

1. Technical Field

The present disclosure relates to a printing apparatus.

2. Related Art

There is known a printing apparatus in which, after printing is performed on a label attached to a base sheet, a portion of the label and the base sheet are peeled off. JP-A-2020-32566 discloses a printing apparatus that includes a medium bending portion downstream of a printing head and in which a medium is bent at the medium bending portion. This printing apparatus can optimize the tension acting on the medium that has been bent at the medium bending portion.

In the case of such a printing apparatus as that disclosed in JP-A-2020-32566, the tension does not act on a peeled portion of the label that is peeled off from the base sheet. Thus, the posture of the peeled portion of the label differs according to the size, the shape, the material, or the like of the label. For example, in some cases, the peeled portion of the label droops under its own weight. Such cases cause a problem in that it is difficult to achieve automation in subsequent steps such as attaching the label to an article, and operability for an operator is poor.

SUMMARY

One aspect of the present disclosure is a printing apparatus including a printing head configured to perform printing on a front surface of a label of a label sheet obtained by attaching a back surface of the label to a base sheet, an airflow generating unit configured to generate an airflow, a first flow path that includes a one-side end coupled to the airflow generating unit and an another-side end coupled to a first discharge port and through which the airflow passes, and a peeling unit disposed downstream of the printing head in a transport direction of the label sheet and configured to partially peel the label from the base sheet, wherein, when, of the label partially peeled from the base sheet by the peeling unit, at least a portion of a peeled portion peeled from the base sheet is at a position not overlapping with the peeling unit in plan view and a non-peeled portion not peeled from the base sheet is in a state of overlapping with the peeling unit in plan view, the first discharge port is disposed at such a position that the airflow outputted from the first discharge port hits the back surface of the peeled portion.

DESCRIPTION OF EXEMPLARY EMBODIMENTS

1. Overall Configuration of Printing Apparatus

Figure 1:
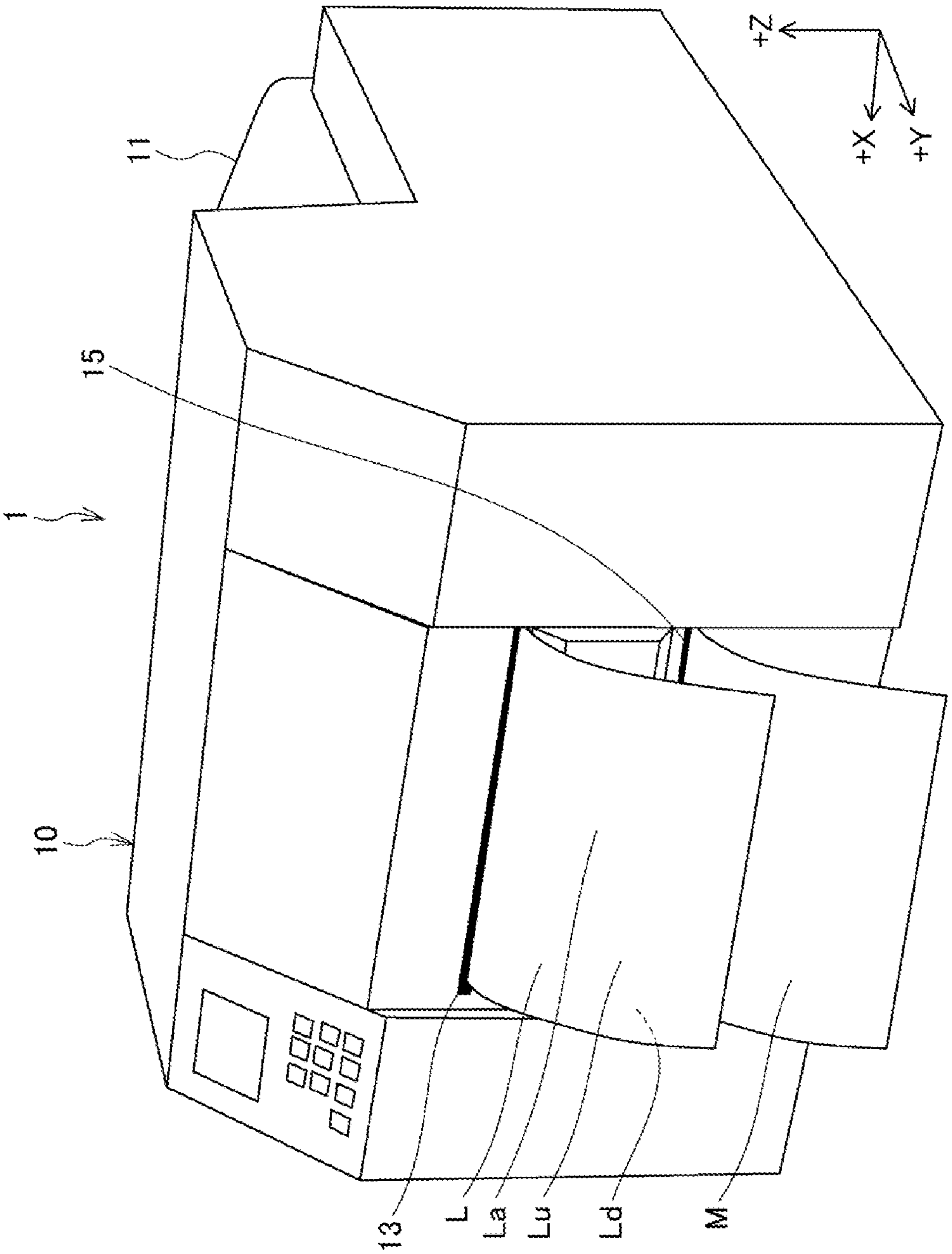
FIG. 1 is a perspective view illustrating a printing apparatus according to an embodiment.

FIG. 1 is a perspective view illustrating a printing apparatus 1 according to an embodiment. The printing apparatus 1 is an ink jet-type printer. The printing apparatus 1 performs printing on a front surface Lu of a label L of a label sheet LM obtained by attaching a back surface Ld of the label L to the base sheet M. The front surface Lu is a surface opposite from the back surface Ld. An adhesive is applied to the back surface Ld of the label L, and the label L is attached to the base sheet M.

After performing printing on the front surface Lu of the label L, the printing apparatus 1 causes a portion of the label L and the base sheet M to be peeled off, and ejects a peeled portion La to the outside of a housing 10. The peeled portion La is a portion of the label L and is a portion that has been peeled off from the base sheet M. The other portion of this label L is in a state of being held on the base sheet M. A portion of the label L that has not been peeled off, that is, a portion held on the base sheet M is referred to as a non-peeled portion Lb.

The printing apparatus 1 detects that, in a state in which the peeled portion La of the label L protrudes from the housing 10, this label L is removed by an operator or a device in subsequent steps. After detecting that the label L is removed, the printing apparatus performs printing on the front surface Lu of a new label L, and causes a portion of the label L on which printing has been performed, to be peeled off from the base sheet M to eject the peeled portion La again.

An X-axis, a Y-axis, and a Z-axis are illustrated in FIG. 1. The X-axis, the Y-axis, and the Z-axis intersect each other at a right angle. The Z-axis is an axis extending in the up-down direction, and may be referred to as an axis extending in the vertical direction. The X-axis and the Y-axis are parallel to a horizontal surface. In the following description, a direction along the X-axis is set as the left-right direction, and a direction along the Y-axis is set as the front-rear direction. Specifically, the positive direction along the Z-axis is referred to as an upward direction. The positive direction along the X-axis is referred to as a rightward direction. The positive direction along the Y-axis is referred to as a front direction. The X-axis, the Y-axis, and the Z-axis in FIG. 1 each indicate the same direction in each drawing that will be described later. The X-axis corresponds to a second axis, and the Y-axis corresponds to a first axis.

The printing apparatus 1 includes the housing 10 made of resin. The housing 10 is a box configured to accommodate individual components included in the printing apparatus 1 and the label sheet LM serving as the target of printing. At the front face of the housing 10, a first paper exit 13 that is a hole extending in the left-right direction and opened toward the front is formed. In addition, the housing 10 includes a second paper exit 15 that is a hole located below the first paper exit 13, extending in the left-right direction, and opened toward the front. The first paper exit 13 is an outlet for ejecting, to the outside of the housing 10, the peeled portion La of the label L peeled off from the base sheet M after printing is completed. The second paper exit 15 is an outlet for ejecting, to the outside of the housing 10, the base sheet M from which the label L is removed.

Figure 2:
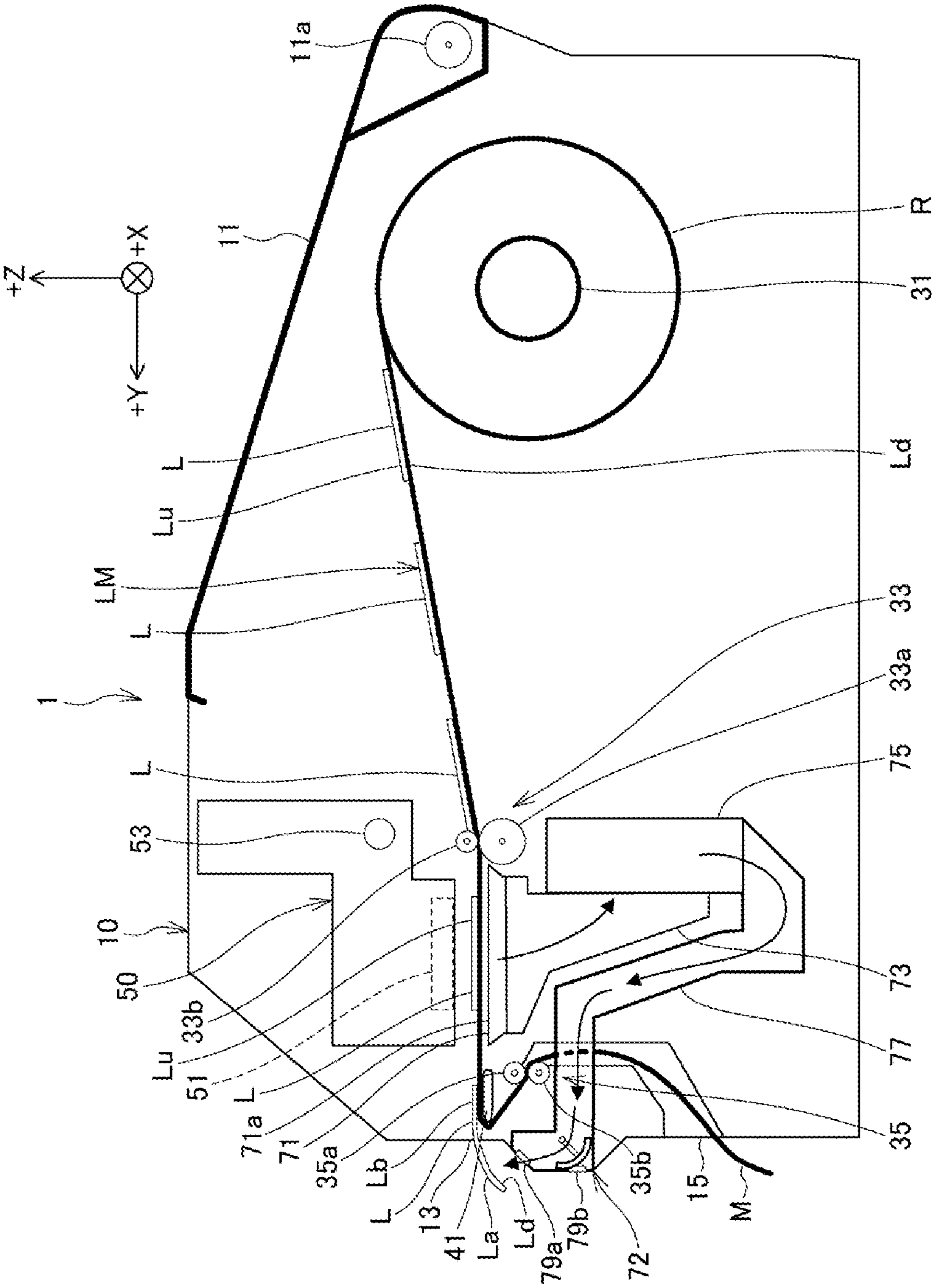
FIG. 2 is a cross-sectional view illustrating the printing apparatus.

FIG. 2 is a cross-sectional view of the printing apparatus 1, and illustrates the printing apparatus 1 in cross section that is perpendicular to the left-right direction. The black arrows in the drawing indicate the flow of air. In the printing apparatus 1, a roll medium R obtained by winding the label sheet LM around the hollow core is supported by a medium mounting portion 31. The medium mounting portion 31 is a rod having a circular shape in cross section and extending in the left-right direction. The medium mounting portion 31 is inserted into the core of the roll medium R to rotatably support the roll medium R.

A rear panel 11 is provided at a rear portion of the housing 10. The rear panel 11 is a panel located at a rear portion of the housing 10. The rear panel 11 is rotatably supported by a rotational movement shaft 11*a* extending in the left-right direction. As the rear panel 11 is opened, it is possible to install the roll medium R from the outside of the housing 10 and it is also possible to attach or detach the roll medium R to or from the medium mounting portion 31.

The label sheet LM can be pulled out toward the front in a state in which the roll medium R is mounted at the medium mounting portion 31. The label sheet LM that has been pulled out from the roll medium R is in a state in which the front surface Lu of the label L that has been attached on the upper surface of the base sheet M faces upward. The label sheet LM that has been pulled out toward the front is further pulled toward the front through a first transport unit 33. The first transport unit 33 includes a first driving roller 33*a* and a first driven roller 33*b*. The first driving roller 33*a* rotationally drives with the power of the first motor 37 illustrated in FIG. 7 using the left-right direction as the axis. The first driven roller 33*b* is a roller rotatably supported by a shaft extending in the left-right direction, and is in contact with the first driving roller 33*a*. With the power of the first motor 37, the first transport unit 33 transports the label sheet LM toward the front with the label sheet LM sandwiched between the first driving roller 33*a* and the first driven roller 33*b*.

The printing apparatus 1 includes a carriage 50 and a platen 71. The carriage 50 and the platen 71 are disposed, in front of the first transport unit 33, arranged in the up-down direction. The label sheet LM pulled out by the first transport unit 33 toward the front passes through between the carriage 50 and the platen 71 toward the front.

Figure 7:
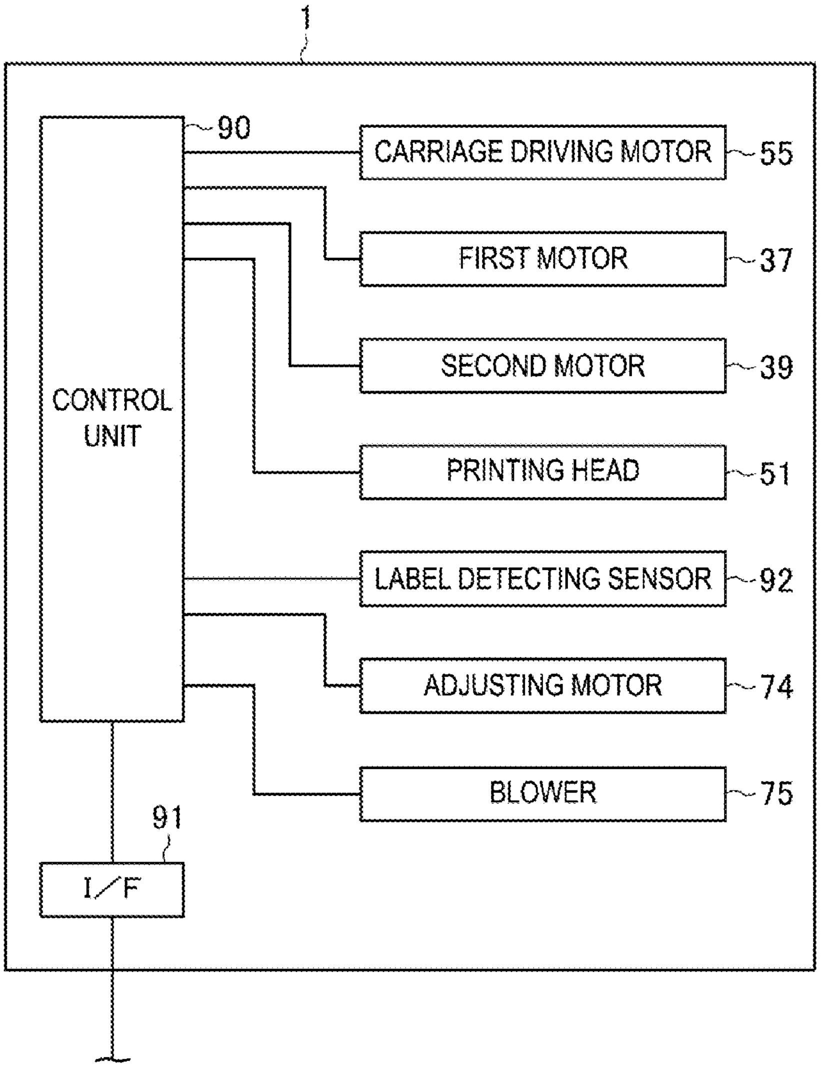
FIG. 7 is a schematic view illustrating a configuration of a control system of the printing apparatus.

The carriage 50 is supported by a guide shaft 53. The guide shaft 53 is a shaft extending in the left-right direction of the housing 10 and fixed to the housing 10. As the driving force from a carriage driving motor 55 illustrated in FIG. 7 is transmitted, the carriage 50 moves in the left-right direction along the guide shaft 53. The carriage driving motor 55 is a motor configured to operate under the control of a control unit 90 that will be described later. The printing head 51 is mounted in the lower end portion of the carriage 50.

The printing head 51 includes a piezo actuator and a nozzle, which are not illustrated. With the driving of the piezo actuator, the printing head 51 discharges ink from the nozzle opened at the lower surface of the printing head 51. With this configuration, the printing head 51 performs printing on the front surface Lu of the label L. The printing apparatus 1 performs movement of the carriage 50 by the carriage driving motor 55 and discharging of ink from the printing head 51 in a combined manner. With this configuration, the printing apparatus 1 performs printing on the front surface Lu of the label L of the label sheet LM sucked at the upper surface of the platen 71.

The platen 71 is a plate member provided with the upper surface thereof lying substantially horizontally, and is disposed at a position opposed to the printing head 51. The platen 71 serves as one example of a “support portion.” In addition, the upper surface of the platen 71 serves as one example of a “support face.” The platen 71 includes a large number of small suction holes 71*a* penetrating the platen 71 in the up-down direction from the upper surface thereof. Although details will be described later, air above the upper surface of the platen 71 is drawn downward through the suction holes 71*a* with the driving of a blower 75. With this configuration, the platen 71 supports the label sheet LM at the upper surface thereof, and also sucks the label sheet LM through the suction holes 71*a* provided at the upper surface thereof.

The label sheet LM on which printing has been completed is transported to a peeling member 41 disposed in front of the printing head 51, that is, disposed downstream of the printing head 51 in the transport direction of the label sheet LM. The peeling member 41 serves as one example of a “peeling unit.” The peeling member 41 is a member fixed to the housing 10. The front end of the peeling member 41 is curved to protrude toward the front. The label sheet LM is transferred toward the front along the upper surface of the peeling member 41. Furthermore, the base sheet M of the label sheet LM is bent downward toward the rear along the front end of the peeling member 41, and is sandwiched by a second transport unit 35. The second transport unit 35 includes a second driving roller 35*a* and a second driven roller 35*b*. As the power is transmitted from a second motor 39 illustrated in FIG. 7, the second driving roller 35*a* rotationally drives with the axis extending in the left-right direction being the center. The second driven roller 35*b* is a roller rotatably supported by a shaft extending in the left-right direction, and is in contact with the second driving roller 35*a*. With the power of the second motor 39, the second transport unit 35 pulls the base sheet M downward with the base sheet M sandwiched between the second driving roller 35*a* and the second driven roller 35*b*.

In this manner, as the base sheet M is pulled by the second transport unit 35, the base sheet M is pressed against the front end of the peeling member 41, and is bent downward toward the rear. Up to the upper surface of the peeling member 41, the label L moves following the base sheet M due to the adhesive force of the back surface Ld. Subsequently, as the base sheet M is bent along the front end of the peeling member 41, the back surface Ld comes unstuck from the base sheet M, and a portion of the label L is peeled off from the base sheet M. In this manner, the peeling member 41 causes a portion of the label L to be peeled off from the base sheet M. The peeled portion La peeled off from the base sheet M sticks out toward the front from the front end of the peeling member 41, and is ejected toward the front of the housing 10 through the first paper exit 13. The base sheet M bent by the peeling member 41 is transported downward by the second transport unit 35, and is ejected from the second paper exit 15 toward the front of the housing 10. In the printing apparatus 1, the first motor 37 may be stopped during an operation of transporting the base sheet M by the second transport unit 35 and causing the label L to come unstuck from the base sheet M. In this case, the second transport unit 35 pulls the base sheet M in a state in which the first transport unit 33 is stopped, and hence, the tension applied to the base sheet M increases. This tension helps the label L come unstuck from the base sheet M at the front end of the peeling member 41.

The printing apparatus 1 uses a label detecting sensor 92, which will be described later, to detect that the peeled portion La sticks out by a predetermined length from the first paper exit 13 toward the front. At this point in time, the printing apparatus 1 stops feeding the label sheet LM by the first transport unit 33 and the second transport unit 35. At this time, the non-peeled portion Lb is not peeled off from the base sheet M, and is supported by the base sheet M due to the adhesive force of the back surface Ld.

The peeled portion La sticking out toward the front from the first paper exit 13 droops downward under its own weight. The printing apparatus 1 causes air to blow against the back surface Ld of the peeled portion La through a first discharge port 79*a* that is a hole communicating with a blower 75, thereby supporting the posture of the peeled portion La. Details of this airflow will be described later.

2. Configuration of Flow Path

Figure 3:
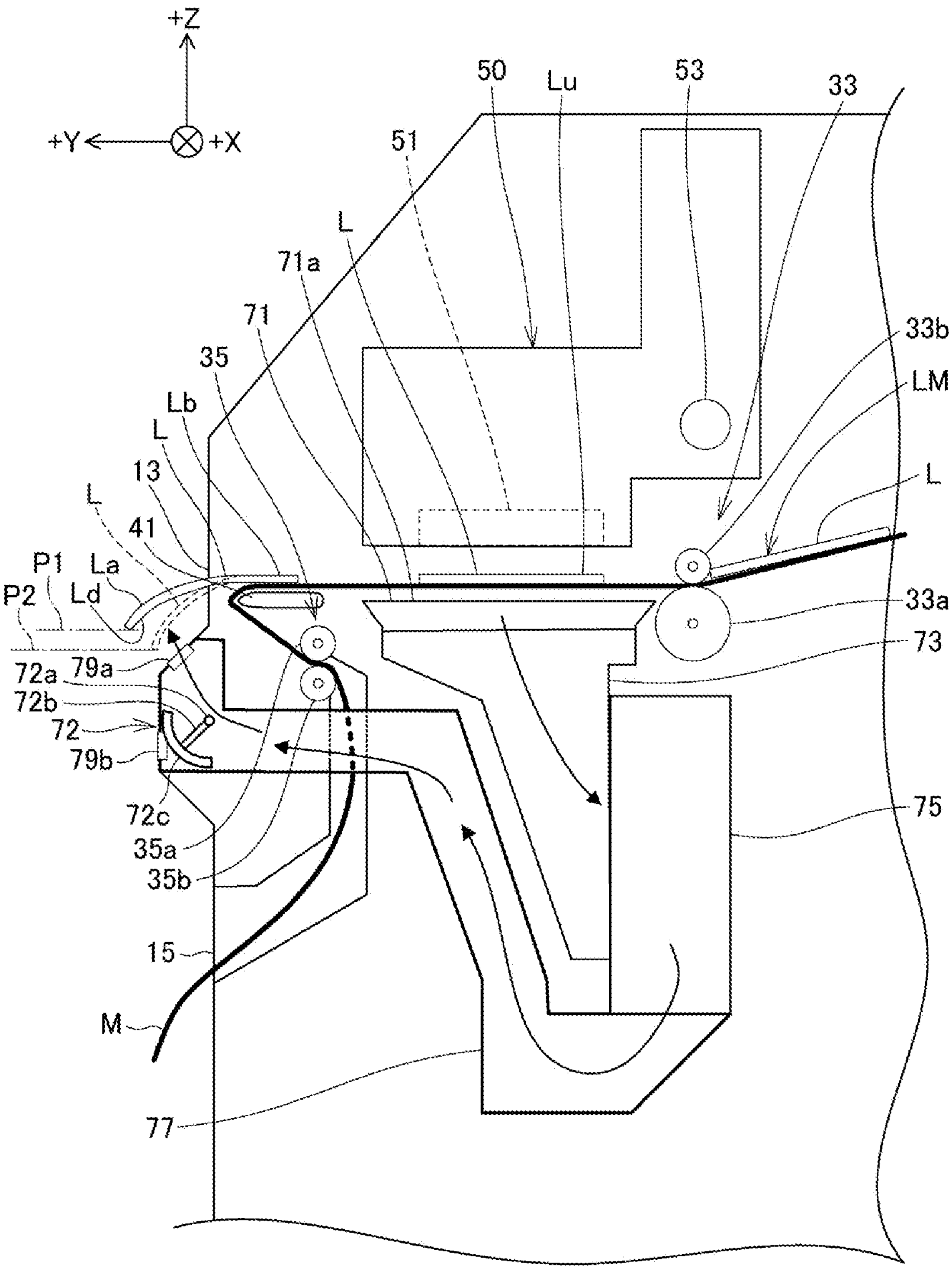
FIG. 3 is a cross-sectional view illustrating main components of the printing apparatus.
Figure 4:
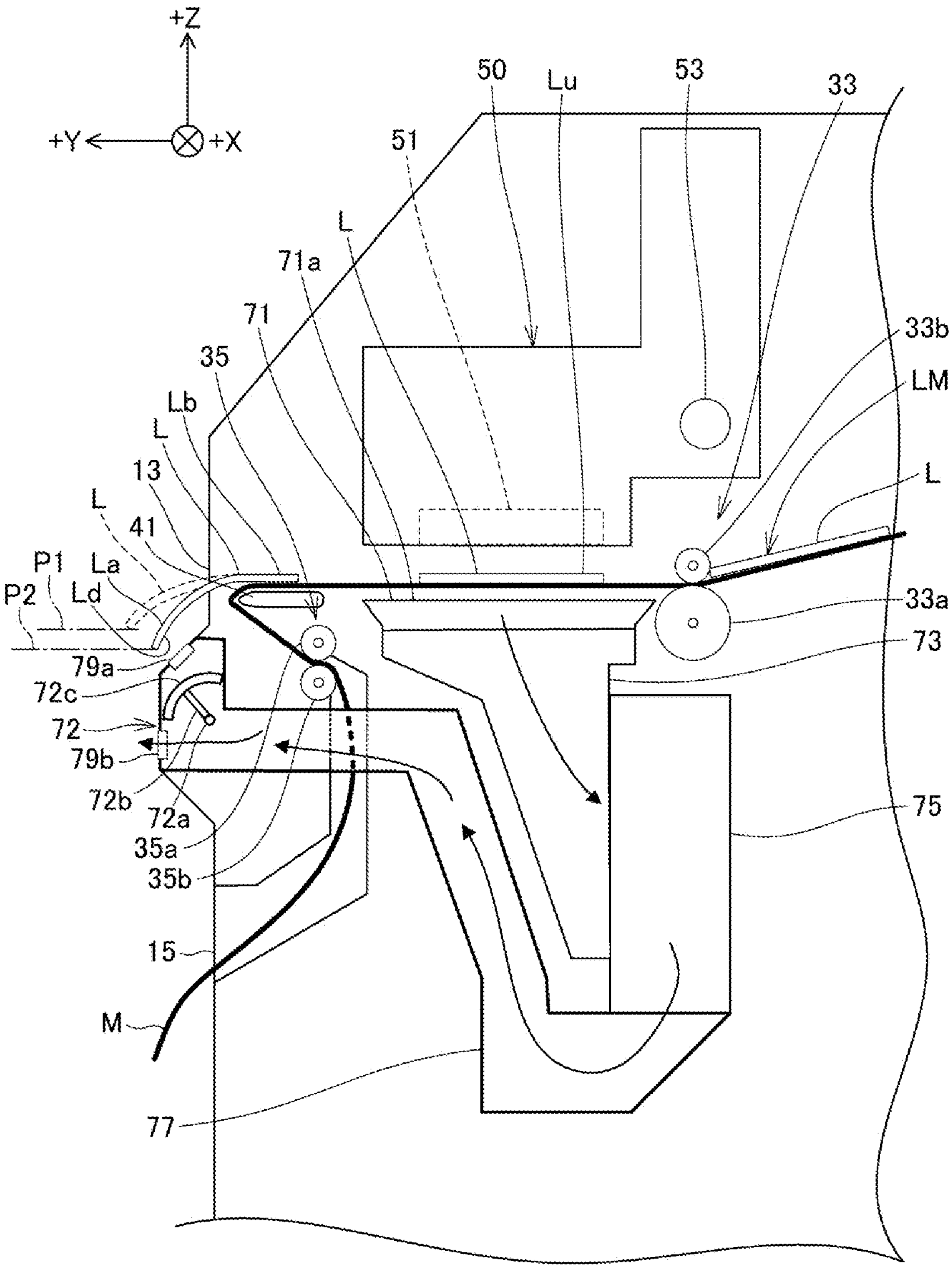
FIG. 4 is a cross-sectional view illustrating main components of the printing apparatus.
Figure 5:
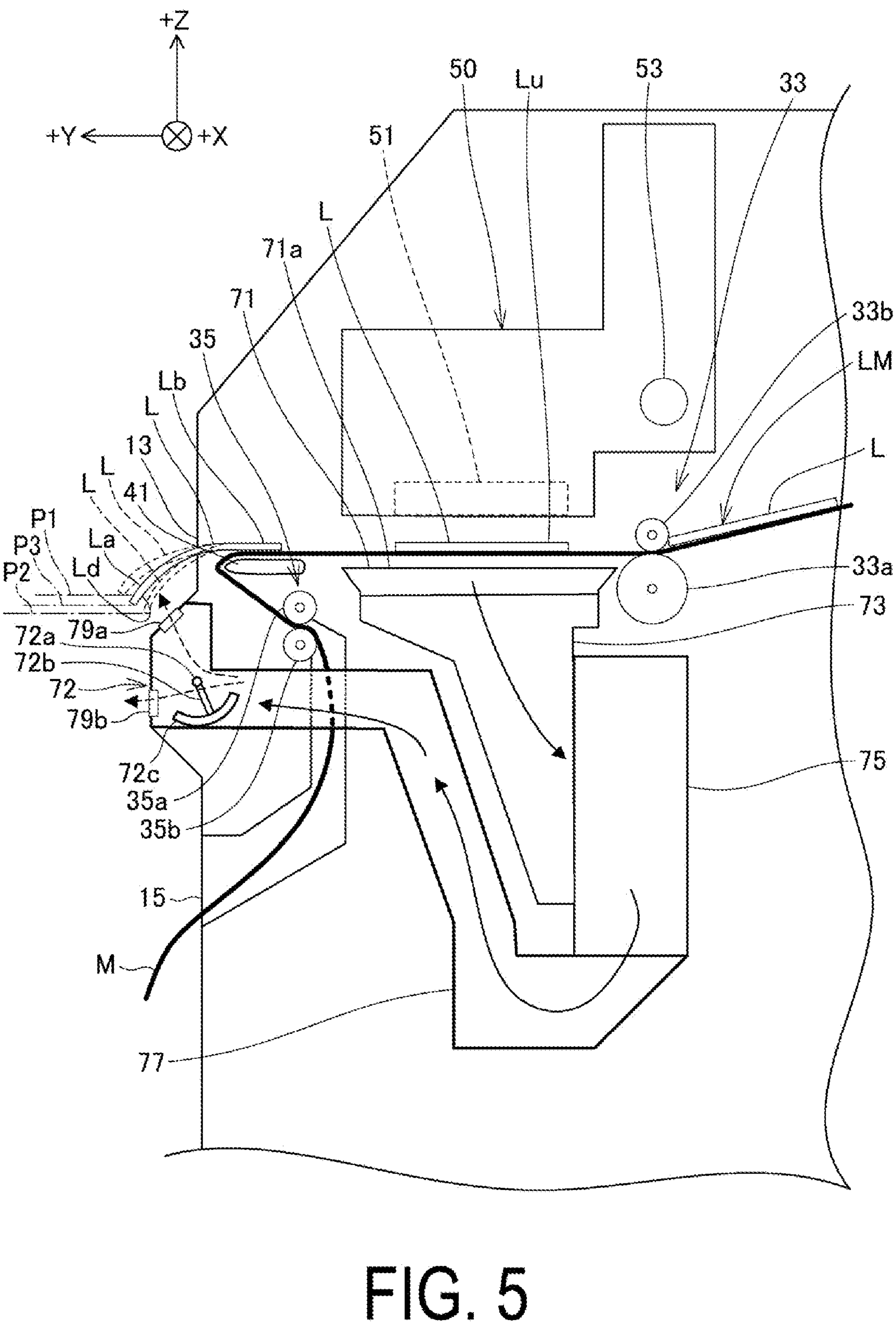
FIG. 5 is a cross-sectional view illustrating main components of the printing apparatus.
Figure 6:
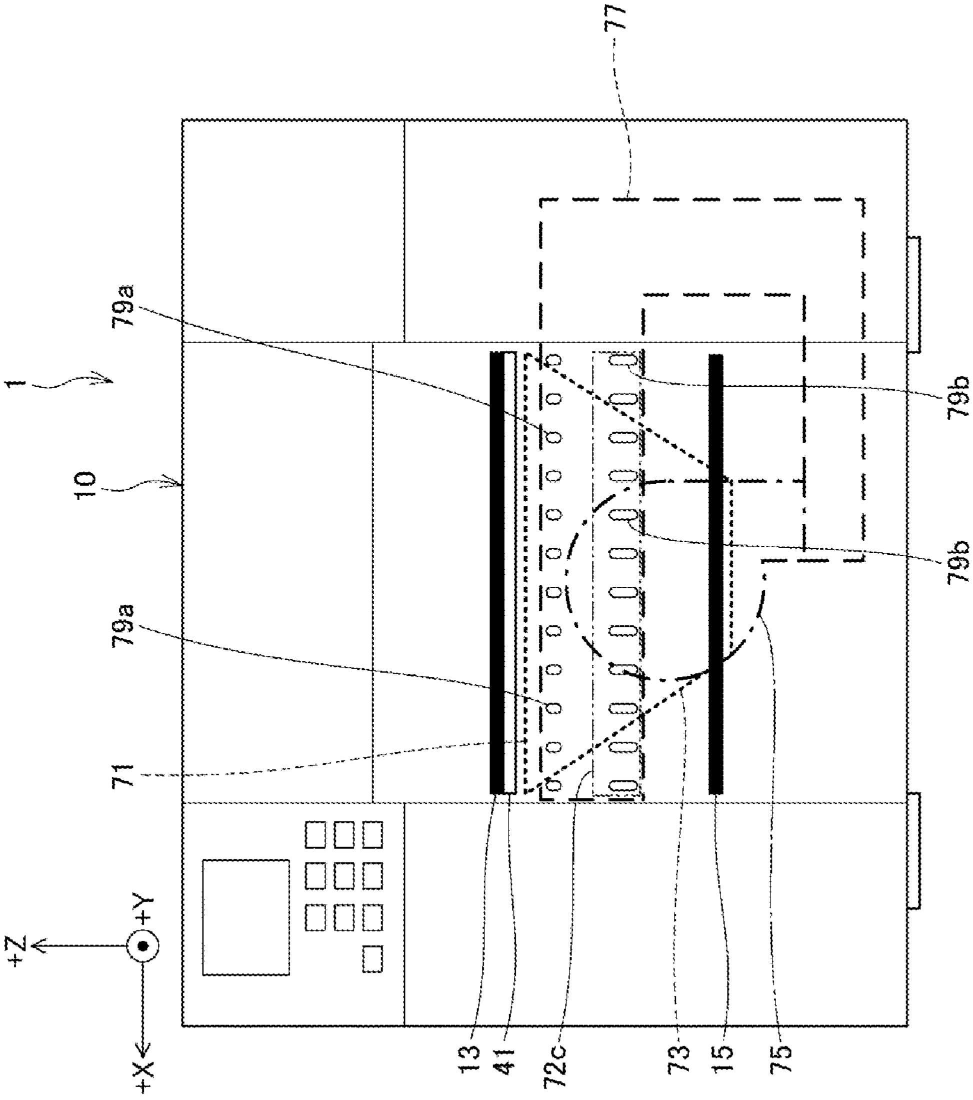
FIG. 6 is a side view illustrating the printing apparatus.

FIGS. 3, 4, and 5 are cross-sectional views each illustrating the main components of the printing apparatus 1, and each illustrate the front portion of the printing apparatus 1 in an enlarged manner in a cross section similar to that in FIG. 2. FIG. 6 is a side view illustrating the printing apparatus 1, and is a diagram illustrating the printing apparatus 1 as viewed from the front.

As described above, the platen 71 sucks the label sheet LM downward by drawing air above the upper surface of the platen 71 downward through the suction holes 71*a*. The suction holes 71*a* bring the space above the upper surface of the platen 71 and the inside of an air drawing duct 73 into communication with each other. The air drawing duct 73 is a hollow duct that includes an upper end blocked by the platen 71 and that extends downward. A lower end of the air drawing duct 73 is coupled to a suction port of the blower 75. That is, the air drawing duct 73 includes a one-side end coupled to the suction holes 71*a* and an another-side end coupled to the blower 75. The air drawing duct 73 serves as one example of a "second flow path."

The blower 75 is a centrifugal air blower configured to draw air from the suction port communicating with the air drawing duct 73 and blow the air from the ejection port disposed at the lower portion. The blower 75 includes a motor and an impeller, which are not illustrated. With the driving of the motor, the impeller rotates to generate an airflow. The blower 75 serves as one example of an "airflow generating unit."

The ejection port of the blower 75 communicates with an exhaust duct 77. The exhaust duct 77 serves as one example of a "first flow path." The exhaust duct 77 is a hollow duct. As illustrated in FIGS. 2 to 5, the exhaust duct 77 extends toward the front from the ejection port of the blower 75 up to the front end of the housing 10, and also extends upward up to the vicinity of the first paper exit 13. The space inside of the exhaust duct 77 communicates with the outside of the housing 10 through the first discharge port 79*a* and a second discharge port 79*b* each opened at the front face of the housing 10. The first discharge port 79*a* is a hole opened obliquely upward toward the front in the vicinity of the first paper exit 13. The second discharge port 79*b* is a hole below the first discharge port 79*a* and opened toward the front. The air blown out from the blower 75 passes through the first discharge port 79*a* and the second discharge port 79*b* and blows obliquely upward toward the front and toward the front of the housing 10. That is, in the exhaust duct 77, the one-side end thereof is coupled to the ejection port of the blower 75, the another-side end thereof is coupled to the first discharge port 79*a* and the second discharge port 79*b*, and an airflow passes through the inside of the exhaust duct 77.

As described above, in a state in which the peeled portion La of the label L sticks out from the first paper exit 13, the air blown out from the first discharge port 79*a* hits the back surface Ld to support the posture of the peeled portion La from below. On the other hand, the air blown out from the second discharge port 79*b* does not hit the peeled portion La. In other words, the first discharge port 79*a* is disposed at such a position that the airflow outputted from the first discharge port 79*a* hits the back surface Ld of the peeled portion La. At this time, at least a portion of the peeled portion La is disposed at a position that does not overlap with the peeling member 41 in plan view, and the non-peeled portion Lb is disposed at a position that overlaps with the peeling member 41. In addition, the second discharge port 79*b* is disposed at such a position that the airflow outputted from the second discharge port 79*b* does not hit the back surface Ld of the peeled portion La.

As illustrated in FIG. 6, the exhaust duct 77 extends toward the left from the ejection port of the blower 75, and extends upward at the left of the second paper exit 15. In this manner, the exhaust duct 77 is disposed so as not to interfere with a path used at the time of ejecting the base sheet M from which the label L has been removed. In addition, the exhaust duct 77 extends toward the right along the front face of the housing 10 up to the right end of the first paper exit 13. In addition, the first discharge port 79*a* and the second discharge port 79*b* are each formed in plurality over the entire region, in the left-right direction, of the first paper exit 13. Accordingly, air blows out from the first discharge ports 79*a* and the second discharge ports 79*b* over the entire region, in the left-right direction, of the lower side of the first paper exit 13. Thus, the entire region, in the left-right direction, of the peeled portion La is supported from below by the air blown out from the first discharge ports 79*a*.

As illustrated in FIGS. 3 to 5, an adjustment unit 72 is provided within the exhaust duct 77 and at or around the first discharge ports 79*a* and the second discharge ports 79*b*. The adjustment unit 72 is a mechanism that can adjust the amount and the distribution of the airflow outputted from the first discharge ports 79*a* and the second discharge ports 79*b*. The adjustment unit 72 includes a shaft 72*a*, an arm 72*b*, and a blocking plate 72*c*. The shaft 72*a* is a shaft extending in the left-right direction of the housing 10, and is fixed to the housing 10. The arm 72*b* is a rod-shaped member, and is rotatably supported by the shaft 72*a*. The blocking plate 72*c* is a plate member bent into an arc shape when viewed from the side surface in the left-right direction, and is fixed at the tip end of the arm 72*b*.

As illustrated in FIG. 6, the blocking plate 72*c* extends in the left-right direction over the entire region, in the left-right direction, of the first discharge ports 79*a* and the second discharge ports 79*b*. In the adjustment unit 72, by rotating the arm 72*b* with the shaft 72*a* being the center, the blocking plate 72*c* together with the arm 72*b* rotates around the axis of the shaft 72*a*. With this configuration, the blocking plate 72*c* can move to a position where the second discharge ports 79*b* are blocked, a position where the first discharge ports 79*a* are blocked, and another position, as illustrated in FIGS. 3 to 5. By moving the position of the blocking plate 72*c*, the adjustment unit 72 adjusts the total flow rate of air blown from the first discharge ports 79*a* and the second discharge ports 79*b* and the proportion thereof. A specific example thereof will be described below.

FIG. 3 illustrates a state in which the blocking plate 72*c* closes the second discharge ports 79*b*. With the blocking plate 72*c* closing the second discharge ports 79*b*, all the air discharged from the blower 75 is blown out from the first discharge ports 79*a*. Thus, the state in which the blocking plate 72*c* closes the second discharge ports 79*b* is a state in which the flow rate of air blown out from the first discharge port 79*a* is the maximum. This increases the force that the back surface Ld receives from the air blown out from the first discharge ports 79*a*, and the position, in the gravitational direction, of the front end of the peeled portion La, that is, the height P1 is located at the highest position as compared with the states illustrated in FIGS. 4 and 5 that will be described later.

FIG. 4 illustrates a state in which the blocking plate 72*c* closes the first discharge ports 79*a*. With the blocking plate 72*c* closing the first discharge ports 79*a*, all the air discharged from the blower 75 is blown out from the second discharge ports 79*b*. The air blown out from the second discharge ports 79*b* does not hit the back surface Ld of the peeled portion La. Thus, force that supports from below and from the outside does not act on the peeled portion La, and the peeled portion La droops downward until its own weight and the elastic force are balanced. Accordingly, the position, in the gravitational direction, of the tip end of the peeled portion La, that is, the height P2 thereof is at the lowest position as compared with the cases in FIGS. 3 and 5.

FIG. 5 illustrates a state in which neither the first discharge ports 79*a* nor the second discharge ports 79*b* is closed by the blocking plate 72*c*. In this case, the air discharged from the blower 75 is blown out from both the first discharge ports 79*a* and the second discharge ports 79*b*. Thus, the flow rate of air blown out from the first discharge ports 79*a* is an intermediate amount between the cases in FIGS. 3 and 4. Thus, the force that the back surface Ld receives from the air blown out from the first discharge ports 79*a* falls in an intermediate value, and the position, in the gravitational direction, of the front end of the peeled portion La, that is, the height P3 is an intermediate position between the cases in FIGS. 3 and 4 described above. In addition, in FIG. 5, the blocking plate 72*c* is disposed upstream of the first discharge ports 79*a* and the second discharge ports 79*b*. In such a case, as the blocking plate 72*c* blocks a portion of the airflow within the exhaust duct 77, it is possible to adjust the total volume of the airflow outputted from the first discharge ports 79*a* and the second discharge ports 79*b*.

In this manner, when the airflow outputted from the first discharge ports 79*a* hits the back surface Ld of the peeled portion La, the position, in the gravitational direction, of the tip end of the peeled portion La is located at a position higher than when the airflow does not hit the back surface Ld of the peeled portion La. It is only necessary that this hold true for at least the label L having the maximum area printable by the printing apparatus 1.

In addition, as described above, the adjustment unit 72 increases the volume of the airflow outputted from the second discharge ports 79*b* by the amount by which the volume of the airflow outputted from the first discharge ports 79*a* is reduced. On the other hand, the adjustment unit 72 increases the volume of the airflow outputted from the first discharge ports 79*a* by the amount by which the volume of the airflow outputted from the second discharge ports 79*b* is reduced. Thus, even when the volume of the airflow outputted from the first discharge ports 79*a* is reduced by the adjustment unit 72, the internal pressure within the exhaust duct 77 is less likely to rise. Accordingly, it is possible to suppress fluctuation in the load of the blower 75, which makes it possible to prolong the service life of the blower 75. In addition, the flow rate of air flowing into the air drawing duct 73 through the suction holes 71*a* is less likely to be affected by the operation of the adjustment unit 72. Thus, it is possible to suppress the influence of the operation of the adjustment unit 72 on the quality of printing.

In the adjustment unit 72, the arm 72*b* may be caused to rotate around the axis of the shaft 72*a* in a manual manner by an operator as the power. For example, it may be possible to employ a configuration in which an operator that uses the printing apparatus 1 can manually move the arm 72*b*. In this case, the adjustment unit 72 includes an operation unit used to move the arm 72*b* from the outside of the housing 10. The operation unit is constituted by, for example, a lever or a dial.

In the present embodiment, the adjustment unit 72 includes a power source that causes the arm 72*b* to rotate around the axis of the shaft 72*a*. The power source includes, for example, a motor or an actuator. The present embodiment describes a configuration in which the adjustment unit 72 includes an adjusting motor 74 as the power source. The adjusting motor 74 corresponds to one example of a "driving unit." The adjusting motor 74 rotates under the control of the control unit 90 to rotate the arm 72*b*. The control unit 90 controls the amount of rotation of the adjusting motor 74 to switch the positions of the arm 72*b* and the blocking plate 72*c*, and stops the arm 72*b* and the blocking plate 72*c* at appropriate positions. The control unit 90 and the adjusting motor 74 will be described later with reference to FIG. 7.

3. Configuration of Control System of Printing Apparatus 1

FIG. 7 is a block diagram of the printing apparatus 1, illustrating a functional configuration of a control system of the printing apparatus 1.

The printing apparatus 1 includes a control unit 90. The control unit 90 includes a central processing unit (CPU), a micro processing unit (MPU), a processor such as a micro controller, and a storage unit. The storage unit of the control unit 90 includes a volatile memory and a non-volatile storage unit. The volatile memory is, for example, a random-access memory (RAM). The non-volatile storage unit includes a read-only memory (ROM), a hard disk, a flash memory, and the like. By executing a program stored in the storage unit, the control unit 90 controls each component of the printing apparatus 1.

An interface (I/F) 91 is coupled to the control unit 90. The interface 91 is a communication device configured to perform wired communication using a cable or wireless communication using a wireless communication line. The interface 91 performs communication with a host computer (not illustrated) to receive print data. The print data includes data on an image or letters that the printing apparatus 1 prints on the label sheet LM, a command that gives an instruction for the printing apparatus 1 to perform printing, and other data. In addition, the print data includes label information that is information regarding the label L serving as the target of printing. The label information includes information regarding the label L serving as the target of printing, such as the area of the label L, the degree of stiffness of the label L, the thickness of the label L, the material of the label L, and the aspect ratio of the label L. Note that the degree of stiffness of the label L may also be referred to as the bending rigidity of the label L. The aspect ratio of the label L may also be referred to as the ratio between the vertical direction and the horizontal direction of the front surface Lu of the label L.

The control unit 90 is coupled to the carriage driving motor 55, the first motor 37, the second motor 39, the printing head 51, the label detecting sensor 92, the adjusting motor 74, and the blower 75. The control unit 90 controls each of the carriage driving motor 55, the first motor 37, the second motor 39, the printing head 51, the adjusting motor 74, and the blower 75.

The label detecting sensor 92 detects whether a portion of the label L is peeled from the base sheet M by the peeling member 41. In other words, the label detecting sensor 92 detects whether the label L of which the peeled portion La is peeled at the peeling member 41 is in a state of being held on the base sheet M. Subsequently, the label detecting sensor 92 outputs a result of detection to the control unit 90. The label detecting sensor 92 serves as one example of a "detector." The label detecting sensor 92 includes, for example, a reflection-type or transmissive-type photosensor, and is provided at or around the first paper exit 13. The label detecting sensor 92 outputs, to the control unit 90, a detection signal corresponding to a case where the photosensor detects the reflected light from the peeled portion La and a detection signal corresponding to a case where the photosensor does not detect the reflected light. The control unit 90 detects, based on the detection signal from the label detecting sensor 92, whether the label L of which the peeled portion La has been peeled off from the base sheet M at the peeling member 41 is in a state of being held on the base sheet M.

When it is determined that the peeled portion La sticks out from the first paper exit 13 by a predetermined length, the control unit 90 causes the first motor 37 and the second motor 39 to be stopped. Subsequently, when the label L that sticks out from the first paper exit 13 is taken from the base sheet M by an operator or a device in subsequent steps, the detection signal from the label detecting sensor 92 changes. In this case, the control unit 90 determines that the label L that sticks out from the first paper exit 13 is taken, and causes the first motor 37 and the second motor 39 to drive again.

The control unit 90 controls the carriage driving motor 55 and the printing head 51 to perform printing on the label L in accordance with the data regarding letters or data included in the print data.

The control unit 90 controls the adjusting motor 74 to move the position of the blocking plate 72*c*, thereby adjusting the flow rate of air blown out from the first discharge ports 79*a* and the second discharge ports 79*b*. At this time, the control unit 90 may receive input from an operator and control the adjusting motor 74 to move the blocking plate 72*c* to the position inputted by the operator.

In addition, the control unit 90 may control the adjusting motor 74 based on the label information that is information regarding the label L serving as the target of printing. The posture of the peeled portion La that sticks out from the first paper exit 13 is influenced by the area, the degree of stiffness, the thickness, the material, the aspect ratio, or the like of the label L. For example, in the case of the label L having a high degree of stiffness, the tip end of the peeled portion La is more likely to be kept at a high position even in a state in which the peeled portion La does not receive the air from the first discharge ports 79*a*. Such a label L is less likely to be affected by the air blown out from the first discharge ports 79*a*. In addition, for example, in the case of the label L having an increased aspect ratio and having an increased size in the front-rear direction, that is, in the transport direction of the label sheet LM, the tip end of the peeled portion La is more likely to droop downward. The posture of such a label L at the peeled portion La is more likely to be affected by the air blown out from the first discharge ports 79*a*.

The control unit 90 may store in advance data that associate, with each other, the label information, the posture of the peeled portion La, and the degree of influence of the air blown out from the first discharge ports 79*a*. In addition, for example, the control unit 90 controls the adjusting motor 74 so that the height of the tip portion of the peeled portion La is located at a targeted height, based on the data described above and the label information regarding the label L serving as the target of printing. Here, the targeted height is set, for example, by an operator.

4. Operation of Printing Apparatus

As described above, after performing printing on the front surface Lu of the label L, the printing apparatus 1 causes the peeling member 41 to peel, from the base sheet M, a portion of the label L on which printing has been performed. The label L of which the peeled portion La has been peeled is held on the base sheet M at the non-peeled portion Lb. With the label detecting sensor 92, the printing apparatus 1 detects that this label L is taken by an operator or a device in the subsequent steps. Subsequently, as the control unit 90 controls each component of the printing apparatus 1, the printing apparatus 1 performs printing again on the front surface Lu of a new label L, and causes the peeling member 41 to peel, from the base sheet M, a portion of the label L on which printing has been performed.

During the operation described above, the peeled portion La does not stick out from the first paper exit 13 during a period of time from a time when the held label L is taken to a time when the label L on which new printing has been performed is peeled by the peeling member 41. At this time, the detection signal from the label detecting sensor 92 indicates a state in which the label L of which the peeling portion La is peeled is not held on the base sheet M.

In this case, the control unit 90 causes the adjusting motor 74 to operate to block the airflow outputted from the first discharge ports 79*a*, thereby causing the airflow traveling through the exhaust duct 77 to be outputted from the second discharge ports 79*b*. With this configuration, it is possible to prevent dust at or around the first discharge ports 79*a* from flying around due to the airflow outputted from the first discharge ports 79*a*. In addition, as the airflow flowing through the exhaust duct 77 can be outputted from the second discharge ports 79*b*, it is possible to suppress the influence on suction of the label sheet LM through the suction holes 71*a*.

When detecting a state in which the label L of which the peeled portion La is peeled is held on the base sheet M based on the detection signal from the label detecting sensor 92, the control unit 90 measures the duration of this state. This state may continue for a long period of time, for example, during a time when an operator engaged in removing the label L is having a break. When this state continues for a long period of time, printing by the printing head 51 stops. Thus, it is not necessary to suck the label sheet LM on the platen 71. Accordingly, when the state in which the base sheet M holds the label L of which the peeled portion La has been peeled off at the peeling member 41 continues for a predetermined period of time or longer, the control unit 90 stops the blower 75. This makes it possible to prevent the airflow generated by the blower 75 from continuously hitting the back surface Ld of one label L. Thus, it is possible to prevent the adhesive applied to the back surface Ld of the label L from drying due to the airflow, which makes it possible to maintain the adhesive force of the back surface Ld of the label L. In addition, as the blower 75 stops, it is possible to reduce the amount of energy consumption.

5. Effect of Embodiment

As described above, the printing apparatus 1 according to the embodiment includes the printing head 51 configured to perform printing on the front surface Lu of the label L of the label sheet LM obtained by attaching the back surface Ld of the label L to the base sheet M, and the blower 75 configured to generate an airflow. In addition, the printing apparatus 1 includes the exhaust duct 77 that includes the one-side end coupled to the blower 75 and the another-side end coupled to the first discharge port 79*a* and through which the airflow passes. The printing apparatus 1 includes the peeling member 41 disposed downstream of the printing head 51 in the transport direction of the label sheet LM and configured to partially peel the label L from the base sheet M. The first discharge port 79*a* is disposed at such a position that the airflow outputted from the first discharge port 79*a* hits the back surface Ld of the peeled portion La. At this time, at least a portion of the peeled portion La is disposed at a position that does not overlap with the peeling member 41 in plan view, and the non-peeled portion Lb is in a state of overlapping with the peeling member 41 in plan view. Of the label L that is partially peeled from the base sheet M by the peeling member 41, the peeled portion La is a portion that has been peeled off from the base sheet M, and the non-peeled portion Lb is a portion that is not peeled off from the base sheet M.

With this configuration, it is possible to support the posture of the peeled portion La of the label L by the airflow generated by the blower 75. Thus, it is possible to easily use the label L in the subsequent steps.

The printing apparatus 1 causes the airflow outputted from the first discharge ports 79*a* to be blown against the back surface Ld to cause the position, in the gravitational direction, of the tip end of the peeled portion La to be located at a position higher than when the airflow outputted from the first discharge ports 79*a* does not hit the back surface Ld of the peeled portion La. When the label L is a label L having the maximum area printable by the printing apparatus 1 as well, the printing apparatus 1 causes the position, in the gravitational direction, of the tip end of the peeled portion La to be located at a position higher than when the airflow outputted from the first discharge port 79*a* does not hit the back surface Ld of the peeled portion La.

With this configuration, even when a largest label L of labels L printable by the printing apparatus 1 is used, it is possible to cause the tip end of the peeled portion La to be located at a higher position. This makes it easy to use the peeled label L in the subsequent steps, which makes it possible to improve the workability.

The printing apparatus 1 includes the platen 71 disposed at a position opposed to the printing head 51 and configured to support the label sheet LM at its upper surface. The platen 71 sucks the label sheet LM through the suction holes 71*a* provided in the upper surface thereof. In addition, the printing apparatus 1 includes the air drawing duct 73 including the one-side end coupled to the suction holes 71*a* and the another-side end coupled to the blower 75.

With this configuration, by driving only one blower 75, it is possible to suck the label sheet LM at the platen 71 and also support the peeled portion La with the airflow outputted from the first discharge ports 79*a*. This makes it possible to maintain the posture of the peeled label L with a simplified configuration, which makes it possible to simplify the structure of the printing apparatus 1.

The printing apparatus 1 includes the adjustment unit 72 capable of adjusting the volume of the airflow outputted from the first discharge ports 79*a*.

With this configuration, it is possible to adjust the volume of airflow outputted from the first discharge ports 79*a* in accordance with the type of label L used and the posture of the peeled portion La that is easy to use in the subsequent steps. Thus, the convenience of the printing apparatus 1 improves.

The printing apparatus 1 includes the adjusting motor 74 configured to move the adjustment unit 72 to adjust the volume of airflow, and the control unit 90 configured to control the adjusting motor 74. The control unit 90 controls the adjusting motor 74 based on the label information that is information regarding the label L serving as the target of printing.

With this configuration, in connection with the posture of the peeled portion La can be adjusted based on information regarding the label L by moving the adjustment unit 72 to adjust the airflow. This makes it possible to set the posture of the peeled label L to be a posture that is easy to be used in the subsequent steps in accordance with the label L used in the printing apparatus 1. Thus, it is possible to improve the convenience of the printing apparatus 1.

The label information includes at least one piece of information regarding the label L serving as the target of printing, the information being from among the area of the label L, the degree of stiffness of the label L, the thickness of the label L, the material of the label L, and the aspect ratio of the label L.

With this configuration, it is possible to control the adjustment unit 72 based on information regarding the properties that influence the posture of the peeled portion La of the label L serving as the target of printing. Thus, the convenience of the printing apparatus 1 improves.

The printing apparatus 1 includes the label detecting sensor 92 configured to detect whether the label L of which the peeled portion La is peeled at the peeling member 41 is in a state of being held on the base sheet M. When it is detected by the label detecting sensor 92 that the label L of which the peeled portion La is peeled is not held on the base sheet M, the control unit 90 controls the adjusting motor 74 to cause the adjustment unit 72 to block the airflow outputted from the first discharge ports 79*a*.

With this configuration, when it is not necessary to support the posture of the peeled portion La with the airflow outputted from the first discharge ports 79*a*, the airflow is not outputted from the first discharge ports 79*a*. Accordingly, it is possible to prevent dust or the like from flying around due to the airflow outputted from the first discharge ports 79*a*.

The printing apparatus 1 includes the second discharge port configured to output the airflow to such a position that the airflow does not hit the back surface Ld of the peeled portion La. In the printing apparatus 1, the exhaust duct 77 includes the another-side end coupled to the first discharge ports 79*a* and the second discharge ports 79*b*. When the volume of the airflow outputted from the first discharge ports 79*a* is reduced, the adjustment unit 72 increases the volume of the airflow outputted from the second discharge ports 79*b* in accordance with the amount by which the volume of the airflow outputted from the first discharge ports 79*a* is reduced.

With this configuration, when the volume of the airflow outputted from the first discharge port 79*a* is adjusted by the adjustment unit 72, it is possible to suppress fluctuation in the load that the blower 75 bears. This makes it possible to prolong the service life of the blower 75. In addition, when the label sheet LM is sucked at the platen 71 with the driving of the blower 75 as in the present embodiment, the flow rate of air flowing into the air drawing duct 73 through the suction holes 71*a* is less likely to be affected by the operation of the adjustment unit 72. This makes it possible to improve the quality of printing.

The printing apparatus 1 includes the label detecting sensor 92 configured to detect whether the label L of which the peeled portion La is peeled at the peeling member 41 is in a state of being held on the base sheet M. The blower 75 stops when the state in which the label detecting sensor 92 detects that the label L of which the peeled portion La is peeled is held on the base sheet M continues for a predetermined period of time or longer.

This configuration reduces the period of time in which the blower 75 is driven, which makes it possible to reduce the amount of energy consumption of the printing apparatus 1. In addition, it is possible to prevent the airflow from continuously hitting the back surface Ld of the peeled portion La of one label L for a long period of time. Thus, when the back surface Ld of the label L is used in the subsequent steps, it is possible to prevent the back surface Ld from not adhering due to drying.

6. Other Embodiment

The embodiment described above is merely given as a specific example to which the present disclosure is applied. The present disclosure is not limited to the configuration of the embodiment described above, and can be implemented in various modes without departing from the main points of the present disclosure.

For example, it may be possible to employ a configuration in which the suction port of the blower 75 is not coupled to the air drawing duct 73 and directly communicates with the outside of the housing 10, and the air drawing duct 73 brings a suction port of a second blower (not illustrated) and the suction holes 71*a* into communication with each other. In addition to this, an ejection port of the second blower may communicate with the outside of the housing 10. That is, it may be possible to separately provide the blower 75 configured to cause an airflow to flow through the exhaust duct 77 to cause the airflow to blow from the first discharge ports 79*a*, and a second blower configured to cause an airflow to flow from the suction holes 71*a* to the air drawing duct 73 to cause the label sheet LM to be sucked at the platen 71. In this case, the degree of freedom in terms of layout of the air drawing duct 73 and the exhaust duct 77 improves. In addition, it is possible to separately provide the airflow generated by the blower 75 and the airflow that causes the label sheet LM to be sucked at the platen 71. This makes it possible to control the posture of the peeled portion La of the label L only by adjusting the number of rotation of the blower 75 without the adjustment unit 72. However, as described in the embodiment, when the airflow is caused to flow to the air drawing duct 73 and the exhaust duct 77 only by one blower 75, it is possible to simplify the configuration of the printing apparatus 1.

Similarly, the adjustment unit 72 need not include a driving source such as the adjusting motor 74, and may be a unit that enables the position of the blocking plate 72*c* to be changed by the hand of an operator. For example, it may be possible to employ a configuration in which a dial (not illustrated) is provided at the outside of the housing 10, and a torque acting when an operator turns the dial is transmitted to change the position of the blocking plate 72*c*. In this case, the adjustment unit 72 does not include a driving source, and no wiring line or the like for the adjustment unit 72 is necessary. This makes it possible to simplify the configuration of the printing apparatus 1. However, as described in the embodiment, by employing a configuration in which the adjustment unit 72 is operated with the driving source such as the adjusting motor 74, it is possible to control the adjustment unit 72 with the control unit 90. Thus, as described in the embodiment, it is possible to achieve functions such as automated control based on the label information, which improves the convenience of the printing apparatus 1.

In addition, for example, the printing apparatus 1 may include a shutter mechanism (not illustrated) provided to close the first discharge port 79*a*. The shutter mechanism is a mechanism that can open and close in the left-right direction, and can adjust the degree of opening in multiple stages. For example, the shutter mechanism may open at the center in the left-right direction, and may be configured such that, as the shutter mechanism closes from the fully opened state, the plurality of first discharge ports 79*a* are sequentially closed from a first discharge port 79*a* located at the outermost side in the left-right direction. In addition, for example, the shutter mechanism may be controlled by the control unit 90 with a driving source such as a motor, or may be directly operated by the hand of an operator. With this configuration, the printing apparatus 1 adjusts the degree of opening of the shutter mechanism in accordance with the width, in the left-right direction, of the label L serving as the target of printing, which makes it possible to increase the volume of the airflow outputted from the first discharge ports 79*a* that are not closed. Thus, the label L can take various types of postures, which improves the convenience of the printing apparatus 1.

In addition, it has been described in the embodiment that the exhaust duct 77 extends toward the left from the ejection port of the blower 75, and is disposed so as not to interfere with a path used at the time of ejecting the base sheet M. The shape of the exhaust duct 77 is not limited to this shape. For example, it may be possible to employ a configuration in which the exhaust duct 77 bifurcates and extends toward both sides in the left-right direction from the ejection port of the blower 75, and is disposed so as not to interfere with the path used at the time of ejecting the base sheet M, and the bifurcating exhaust ducts 77 merge at the front end of the housing 10. When such an exhaust duct 77 that is symmetrical in the left-right direction is used, the volume of the airflow outputted from the plurality of first discharge ports 79*a* is also symmetrical in the left-right direction.

In addition, it has been described in the embodiment that the plurality of first discharge ports 79*a* are formed over the entire region, in the left-right direction, of the first paper exit 13. However, the first discharge port 79*a* may be one hole elongated in the left-right direction and formed over the entire region, in the left-right direction, of the first paper exit 13. In addition, it has been described in the embodiment that the blower 75 is a centrifugal air blower. However, it is only necessary that the blower 75 be a device that can generate an airflow. For example, the blower 75 may be an axial blower including a rotating fan. In addition, it has been described in the embodiment that the adjustment unit 72 is provided within the exhaust duct 77. However, the adjustment unit 72 may be provided outside of the exhaust duct 77. For example, it may be possible to employ a configuration in which the shaft 72*a* extends at the front end of the housing 10 from both ends, in the left-right direction, of the exhaust duct 77 toward the outside, and the blocking plate 72*c* is attached to the shaft 72*a* via the arm 72*b* to cover the first discharge ports 79*a* and the second discharge ports 79*b* from the outside. With this configuration, there is no need to provide the adjustment unit 72 inside of the exhaust duct 77. This makes it easy to install a wiring line or the like to the adjustment unit 72, or makes it easy for an operator to operate the adjustment unit 72.

At least a portion of the functional blocks illustrated in FIG. 7 may be achieved by hardware, or may be achieved through cooperation between hardware and software.

What is claimed is:

1. A printing apparatus comprising:

a printing head configured to perform printing on a front surface of a label of a label sheet obtained by attaching a back surface of the label to a base sheet;

an airflow generating unit configured to generate an airflow;

a first flow path that includes a one-side end coupled to the airflow generating unit and an another-side end coupled to a first discharge port and through which the airflow passes; and a peeling unit disposed downstream of the printing head in a transport direction of the label sheet and configured to partially peel the label from the base sheet, wherein when, of the label partially peeled from the base sheet by the peeling unit, at least a portion of a peeled portion peeled from the base sheet is at a position not overlapping with the peeling unit in plan view and a non-peeled portion not peeled from the base sheet is in a state of overlapping with the peeling unit in plan view, the first discharge port is disposed at such a position that the airflow outputted from the first discharge port hits the back surface of the peeled portion.

2. The printing apparatus according to claim 1, wherein when the label is a label having a maximum printable area, the airflow outputted from the first discharge port is caused to be blown against the back surface to cause a position, in a gravitational direction, of a tip end of the peeled portion to be located at a position higher than when the airflow does not hit the back surface of the peeled portion.

3. The printing apparatus according to claim 1, further comprising:

a support portion disposed at a position opposed to the printing head, the support portion being configured to support the label sheet at a support face and suck the label sheet through a suction hole provided in the support face; and a second flow path including a one-side end coupled to the suction hole and an another-side end coupled to the airflow generating unit.

4. The printing apparatus according to claim 1, further comprising:

an adjustment unit configured to adjust a volume of the airflow outputted from the first discharge port.

5. The printing apparatus according to claim 4, further comprising:

a driving unit configured to move the adjustment unit to adjust the volume of the airflow; and a control unit configured to control the driving unit, wherein the control unit controls the driving unit based on label information that is information regarding the label serving as a target of printing.

6. The printing apparatus according to claim 5, wherein the label information includes, regarding the label serving as the target of printing, information regarding at least one of an area of the label, a degree of stiffness of the label, a thickness of the label, a material of the label, and an aspect ratio of the label.

7. The printing apparatus according to claim 5, further comprising:

a detector configured to detect whether the label of which the peeled portion is peeled at the peeling unit is in a state of being held on the base sheet, wherein when it is detected by the detector that the label of which the peeled portion is peeled is not held on the base sheet, the control unit controls the driving unit to cause the adjustment unit to block the airflow outputted from the first discharge port.

8. The printing apparatus according to claim 4, further comprising:

a second discharge port configured to output the airflow to such a position that the outputted airflow does not hit the back surface of the peeled portion, wherein the another-side end of the first flow path is coupled to the first discharge port and the second discharge port and;

when the volume of the airflow outputted from the first discharge port is reduced, the adjustment unit increases a volume of the airflow outputted from the second discharge port in accordance with an amount by which the volume of the airflow outputted from the first discharge port is reduced.

9. The printing apparatus according to claim 1, further comprising:

a detector configured to detect whether the label of which the peeled portion is peeled at the peeling unit is in a state of being held on the base sheet, wherein the airflow generating unit is stopped when a state in which it is detected by the detector that the label of which the peeled portion is peeled is held on the base sheet continues for a predetermined period of time or longer.

* * * * *